United States Patent
Xiao et al.

(10) Patent No.: US 12,218,975 B2
(45) Date of Patent: Feb. 4, 2025

(54) METHOD AND SYSTEM FOR PROCESSING FULL-STACK NETWORK CARD TASK BASED ON FPGA

(71) Applicant: SUZHOU METABRAIN INTELLIGENT TECHNOLOGY CO., LTD., Jiangsu (CN)

(72) Inventors: Linge Xiao, Jiangsu (CN); Rui Hao, Jiangsu (CN); Hongwei Kan, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/697,423

(22) PCT Filed: Sep. 29, 2022

(86) PCT No.: PCT/CN2022/122791
§ 371 (c)(1),
(2) Date: Mar. 29, 2024

(87) PCT Pub. No.: WO2023/159957
PCT Pub. Date: Aug. 31, 2023

(65) Prior Publication Data
US 2024/0333766 A1  Oct. 3, 2024

(30) Foreign Application Priority Data

Feb. 24, 2022 (CN) .......................... 202210171789.1

(51) Int. Cl.
*H04L 9/40* (2022.01)
*G06F 13/42* (2006.01)

(52) U.S. Cl.
CPC ........ *H04L 63/166* (2013.01); *G06F 13/4221* (2013.01); *G06F 2213/0026* (2013.01)

(58) Field of Classification Search
CPC .......................... H04L 63/166; G06F 13/4221
See application file for complete search history.

(56) References Cited

U.S. PATENT DOCUMENTS

2019/0140979 A1    5/2019  Levi et al.
2021/0117360 A1*   4/2021  Kutch .................. G06F 3/0656
(Continued)

FOREIGN PATENT DOCUMENTS

CN    105516191 A    4/2016
CN    109032987 A    12/2018
(Continued)

OTHER PUBLICATIONS

International Search Report and Written Opinion for International Patent Application No. PCT/CN2022/122791 mailed Dec. 20, 2022, with English translation of Search Report.
(Continued)

Primary Examiner — Oleg Korsak
(74) Attorney, Agent, or Firm — Merchant & Gould P.C.

(57) ABSTRACT

The present disclosure relates to data processing, and in particular, to a system for processing a full-stack network card task based on FPGA. The system includes: a network interface controller, configured to receive to-be-processed data, and offload a TCP/IP task from the to-be-processed data by a built-in TCP offload engine, to obtain first processed data; an SSL/TLS protocol processing module, configured to receive the first processed data, and offload an SSL/TLS protocol task from the first processed data, to obtain second processed data; a PR region, configured to receive the second processed data; and a reconfiguration module, configured to acquire, by a host, dynamic configuration information of the PR region, and configure the PR region based on the dynamic configuration information, so (Continued)

that the PR region offloads and processes computation-intensive tasks in the second processed data.

18 Claims, 5 Drawing Sheets

(56) References Cited

U.S. PATENT DOCUMENTS

| | | | | |
|---|---|---|---|---|
| 2022/0012095 | A1* | 1/2022 | Ylinen | G06F 9/4843 |
| 2022/0100566 | A1* | 3/2022 | Ylinen | G06F 9/5088 |

FOREIGN PATENT DOCUMENTS

| | | | |
|---|---|---|---|
| CN | 109710566 | A | 5/2019 |
| CN | 109714302 | A | 5/2019 |
| CN | 110765064 | A | 2/2020 |
| CN | 210112025 | U | 2/2020 |
| CN | 112100119 | A | 12/2020 |
| CN | 112540770 | A | 3/2021 |
| CN | 113141281 | A | 7/2021 |
| CN | 114238187 | A | 3/2022 |
| WO | 2019083977 | A1 | 5/2019 |
| WO | 2023159957 | A1 | 8/2023 |

OTHER PUBLICATIONS

Sha Meng, et al., "A Review of FPGA's Application in High—Speed Network Processing", National Network New Media Engineering Research Center, Institute of Acoustic, Chinese Academy of Science, Nov. 2021, 11 pgs.

Chinese Search Report received for CN Application No. 2022101717891 on Mar. 29, 2022, 3 pgs.

* cited by examiner

METHOD AND SYSTEM FOR PROCESSING FULL-STACK NETWORK CARD TASK BASED ON FPGA

The present application is a National Stage Application of International Application No. PCT/CN2022/122791, filed Sep. 29, 2022, which claims the benefit of priority to Chinese Patent Application No. 202210171789.1, filed with the China National Intellectual Property Administration on Feb. 24, 2022 and entitled "Method and System for processing full-stack network card task based on FPGA", which is incorporated herein by reference in its entirety. To the extent appropriate, a claim of priority is made to each of the above disclosed applications.

TECHNICAL FIELD

The present disclosure relates to data processing, and in particular, to a method and system for processing a full-stack network card task based on Field-Programmable Gate Array (FPGA).

BACKGROUND

In today's increasingly mature and strong network development, no matter in industrial production or in daily life, massive data is generated. Statistics of International Data Corporation (IDC, an Internet Data Center) show that a growth rate of data volume generated each year from 2017 to 2020 is 20% or higher; and it is expected that by 2025, global data volume will increase 10 times than 16.1 ZB in 2016 and will reach 163 Zettabyte (ZB). Big data gives birth to the development of multiple new computing concepts and devices, such as cloud computing, edge computing and heterogeneous computing. After undergoing a development stage of early rapid expansion, an industry often reveals some underlying problems and requirements, e.g. security, flexibility and energy efficiency ratio. This is obvious in data exchange of multiple networks, and protocol layers at which data on a network needs to be processed during receiving and sending of the data are as shown in FIG. 1.

In a currently widely used TCP/IP network model, taking an FPGA chip-based high-performance network card as an example, offload work (i.e. TCP Offload Engine, TOE for short) from a link layer to a transport layer is achieved by using an Hardware Description Language (HDL) to generate a dedicated hardware circuit. In other words, the hardware circuit is configured to implement multiple computation-intensive works included in the protocol, to release the computation capability of the CPU, and also multiple cross-regional Input/Output (I/O) operations generated when the CPU processes data packets are avoided. By means of such a network card, an application program can directly process the application data, thereby avoiding the intervention of an operating system.

By the introduction above, it can be found that the current technical solution has the following disadvantages: (1) lacking full-stack capability and systematic integration. Although manufacturers provide offloading FPGA hardware of each protocol to achieve an Intellectual Property (IP) core, two problems still exist: on the one hand, offloading of computation-intensive tasks in an actual application is not thorough, for example, when original application data itself is data such as a picture, a compressed packet, etc., processing calculation on these data still needs to be achieved by software, i.e. the full-stack capability is insufficient; and on the other hand, although multiple upstream manufacturers provide FPGA implementations for handling these protocols, there is a lack of systematic integration. (2) Based on the full-stack capability, there is a lack of flexible offloading of self-defined original application data. At present, processing of big data is complicated, and widely used standard protocols or data formats cannot completely cover requirements of all FPGA network card users. When original application data sent or received by a user of an FPGA network card is of a self-defined type and contains heavy computation-intensive tasks, it is necessary to further process the "original application data", to obtain "processed data".

SUMMARY

In view of this, in order to make an FPGA network card achieve objects of providing a task offload capability as high as possible while satisfying requirements of different users as far as possible, that is, providing as many scenario service capabilities as possible, as hardware devices included by one service provider are always limited, in order to achieve the described objects, a method is needed to dynamically meet the processing of original application data at last station of data processing in an FPGA network card, to maximize FPGA resource utilization rate and utilization rate of multiple peripheral devices, etc.

Some embodiments of the present disclosure provide method for processing a full-stack network card task based on FPGA, the method including:
  receiving to-be-processed data and offloading a TCP/IP task from the to-be-processed data by a built-in TCP offload engine, to obtain first processed data;
  offloading an SSL/TLS protocol task from the first processed data to obtain second processed data; and
  acquiring, by a host, dynamic configuration information of a Partial Reconfiguration (PR) region where the second processed data is located, and configuring the PR region based on the dynamic configuration information, so that the PR region offloads and processes computation-intensive tasks in the second processed data.

In some embodiments, the offloading the SSL/TLS protocol task from the first processed data, to obtain the second processed data, includes:
  receiving the first processed data, and distributing the first processed data to at least one idle SSL/TLS engine according to status signals fed back by SSL/TLS engines, as to execute SSL/TLS protocol task processing, and to generate at least one piece of second processed data; and
  acquiring the at least one piece of second processed data from the at least one idle SSL/TLS engine and transferring the at least one piece of second processed data to the PR region.

In some embodiments, distributing the first processed data to the at least one idle SSL/TLS engine according to status signals fed back by SSL/TLS engines, as to execute SSL/TLS protocol task processing, and to generate the at least one piece of second processed data, includes:
  writing at least one SSL/TLS engine serial number of at least one idle SSL/TLS engine executing the SSL/TLS protocol task processing at this time is written into an Input First Output (FIFO) memory; and
  reading the at least one SSL/TLS engine serial number from the FIFO memory, and acquiring the at least one piece of second processed data from at least one SSL/TLS engine corresponding to the at least one SSL/TLS engine serial number.

In some embodiments, acquiring, by the host, the dynamic configuration information of the PR region where the second processed data is located, and configuring the PR region based on the dynamic configuration information, so that the PR region offloads and processes computation-intensive tasks in the second processed data, includes:
  acquiring dynamic configuration information from a memory of a host, and storing the dynamic configuration information; and
  taking out the dynamic configuration information and sending the dynamic configuration information to a PR IP core, and sending out an interrupt signal after the sending is completed;
  reconfiguring and programming the PR region based on the dynamic configuration information via a preset port by a fixed protocol; and
  reading a preset register of the PR IP core to determine whether the reconfiguration is successful, and reporting a determination result to the host via a Peripheral Component Interconnect express (PCIe).

In some embodiments, before reconfiguring and programming the PR region based on the dynamic configuration information via a preset port by a fixed protocol, the method further includes:
  checking whether the dynamic configuration information is correct; and
  performing reconfiguration on the PR region in response to the dynamic configuration information is correct.

In some embodiments, FPGA communicates with the host via a PCIe bus.

In some embodiments, the PR region is a neural network model or an image inference model.

Some embodiments of the present disclosure provide system for processing a full-stack network card task based on FPGA, the system including:
  a network interface controller, configured to receive to-be-processed data, and offload a TCP/IP task from the to-be-processed data by a built-in TCP offload engine, to obtain first processed data;
  an SSL/TLS protocol processing module, configured to receive the first processed data, and offload an SSL/TLS protocol task from the first processed data, to obtain second processed data;
  a PR region, configured to receive the second processed data; wherein PR refers to Partial Reconfiguration; and
  a reconfiguration module, configured to acquire, by a host, dynamic configuration information of the PR region, and configure the PR region based on the dynamic configuration information, so that the PR region offloads and processes computation-intensive tasks in the second processed data.

In some embodiments, the SSL/TLS protocol processing module includes a first arbitration module, a second arbitration module and a plurality of SSL/TLS engines in parallel between the first arbitration module and the second arbitration module;
  the first arbitration module, configured to receive the first processed data from the network interface controller, and distribute the first processed data to at least one idle SSL/TLS engine according to status signals fed back by SSL/TLS engines, as to execute SSL/TLS protocol task processing, and to generate at least one piece of second processed data; and
  the second arbitration module, configured to acquire the at least one piece of second processed data from the at least one idle SSL/TLS engines and transfer the at least one piece of second processed data to the PR region.

In some embodiments, the SSL/TLS protocol processing module further includes an First Input First Output (FIFO) memory connected to both the first arbitration module and the second arbitration module;
  the first arbitration module, configured to write at least one SSL/TLS engine serial number of at least one idle SSL/TLS engine executing the SSL/TLS protocol task processing at this time into the FIFO memory; and
  the second arbitration module, configured to read the at least one SSL/TLS engine serial number from the FIFO memory, and acquire the at least one piece of second processed data from at least one SSL/TLS engine corresponding to the at least one SSL/TLS engine serial number.

In some embodiments, the reconfiguration module comprises a PR IP core, Double Date Rate (DDR), a Direct Memory Access (DMA) controller and a Checker;
  the DMA controller, configured to acquire dynamic configuration information from a memory of the host according to a DMA descriptor sent by the host, and store the dynamic configuration information into the DDR; and
  the DMA controller, configured to take out the dynamic configuration information from the DDR via a DDR controller and send the dynamic configuration information to the PR IP core, and send an interrupt signal to the Checker after the sending is completed;
  the PR IP core, configured to reconfigure and program the PR region based on the dynamic configuration information via a preset port by a fixed protocol; and
  the Checker, configured to read a preset register of the PR IP core to determine whether the reconfiguration is successful, and report a determination result to the host via a Peripheral Component Interconnect express (PCIe).

In some embodiments, the PR IP core includes a Cyclic Redundancy Check (CRC) module and a PR control module;
  the CRC module, configured to check whether the dynamic configuration information is correct; and
  the PR control module, configured to perform reconfiguration on the PR region in response to the dynamic configuration information is correct.

In some embodiments, the PR IP core is further configured to freeze activities of all other signals except a global signal while executing the reconfiguration and programming.

In some embodiments, the DMA controller and the PR IP core communicate via an Avalon bus.

In some embodiments, the Checker and the PR IP core communicate via an Avalon bus.

In some embodiments, the FPGA communicates with the host via a PCIe bus.

In some embodiments, the PR region is a neural network model or an image inference model.

Some embodiments of the present disclosure further provide a non-transitory readable storage medium, the non-transitory readable storage medium storing a computer program, which when executed by a processor, executes the steps of the method for processing a full-stack network card task based on FPGA according to any one above.

Some embodiments of the present disclosure further provide a computing processing device, comprising:
  a memory in which computer-readable codes are stored; and at least one processor, wherein when the computer-readable codes are executed by the at least one processor, the computing processing device executes the steps of the method for processing a full-stack network card task based on FPGA according to any one above.

Some embodiments of the present disclosure further provide a computer program product, comprising computer-readable codes, wherein when the computer-readable codes run on a computing processing device, the computing processing device executes the steps of the method for processing a full-stack network card task based on FPGA according to any one above.

The method and system for processing a full-stack network card task based on FPGA can not only offload computation-intensive tasks in network layer and transport layer protocols, but also flexibly update the PR region according to actual requirements, thereby realizing dynamic multi-scenario task offloading of an application layer, which not only sufficiently releases a universal computing capability of a CPU of the host, fully utilizing FPGA resources, reducing energy consumption, but also greatly saves data processing time.

BRIEF DESCRIPTION OF THE DRAWINGS

In order to describe the solutions in the embodiments of the present disclosure or in the related art more clearly, hereinafter, accompanying drawings requiring to be configured to describe the embodiments or the related art are introduced briefly. Apparently, the accompanying drawings in the following description merely relate to some embodiments of the present disclosure, and for a person of ordinary skill in the art, other embodiments can also be derived from these accompanying drawings without involving any inventive effort.

DETAILED DESCRIPTION OF THE EMBODIMENTS

In order to make objects, technical solutions and advantages of some embodiments of the present disclosure clearly understood, hereinafter, embodiments of the present disclosure will be further described in detail in conjunction with embodiments and with reference to the accompanying drawings. In addition, terms "first" and "second" are only used for descriptive purposes, and cannot be understood as indicating or implying relative importance or implicitly indicating the number of indicated technical features. Thus, features defined by "first" and "second" may explicitly or implicitly comprise at least one feature. In the illustration of some embodiments of the present disclosure, the meaning of "multiple" is two or two and more, unless explicitly and defined otherwise.

Taking security as an example, in the low-speed Internet period, a Transmission Control Protocol (TCP)/Internet Protocol (IP) protocol was developed, and the TCP/IP protocol provides simple assurance for data correctness and integrity by means of calculating checksums, etc. In addition, a widely used Secure Sockets Layer (SSL)/Transport Layer Security (TLS) protocol was also developed, and serves as an intermediate protocol between a transport layer and an application layer, thereby providing further protection for application data, that is, integrity and authenticity of data are ensured by means of encryption and decryption calculation, Hash calculation, etc. on the application data. In the early stage, a system function library was built in an operating system to implement the process above, that is, a Central Processing Processor (CPU) was used to complete complex calculation in the protocol. With explosive growth of data volume and emergence of multiple large-scale data centers, disadvantages of such method gradually emerged: occupying a large amount of CPU, high energy consumption and slow speed.

Figure 1:
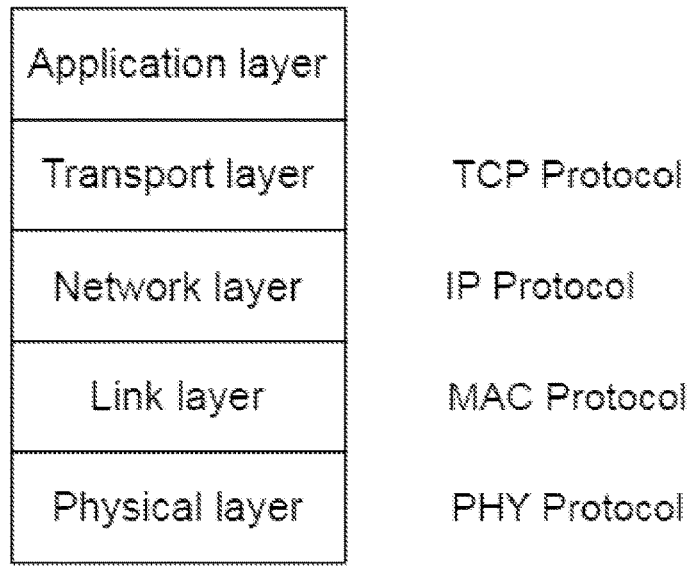
FIG. 1 is a typical network protocol model in the related art.
Figure 2:
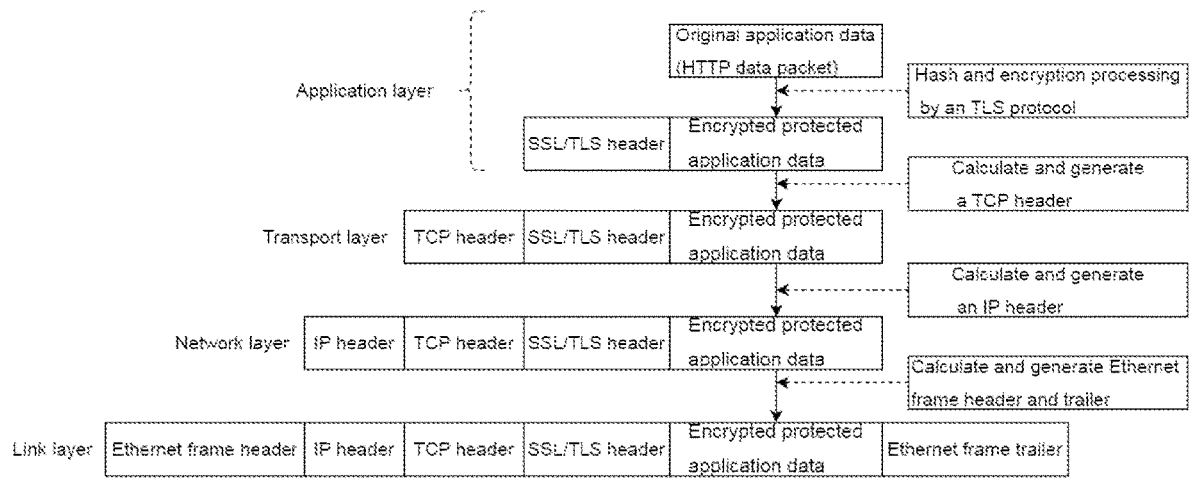
FIG. 2 is a schematic diagram of a data sending process in a HTTPS protocol scenario in the related art.

In a currently widely used TCP/IP network model, taking an FPGA chip-based high-performance network card as an example, offload work (i.e. TCP Offload Engine, TOE for short) from a link layer to a transport layer is achieved by using an Hardware Description Language (HDL) to generate a dedicated hardware circuit. In other words, the hardware circuit is configured to implement multiple computation-intensive works included in the protocol, to release the computation capability of the CPU, and also multiple cross-regional Input/Output (I/O) operations generated when the CPU processes data packets are avoided. By means of such a network card, an application program can directly process the application data, thereby avoiding the intervention of an operating system. Currently, many manufacturers on the market provide an FPGA-based TOE-supporting network card. In addition to the TOE for offloading a physical layer to transport layer protocol, many FPGA manufacturers also separately provide an offload engine for offloading the TLS/SSL protocol, to provide implementation of a hardware circuit of the protocol. Taking a common HTTPS protocol in a web service as an example, a running process of the HTTPs protocol is actually to encrypt an HTTP data packet, encapsulate same in a payload of the SSL/TLS protocol, and then send same as new application layer data, in which implementation of a software protocol stack during receiving and sending data is as shown in FIG. 2. No matter what network card, the physical layer is always completed by a dedicated hardware circuit; and for the FPGA, each manufacturer basically provides FPGA implementation of the physical layer for free. Therefore, only data transmission from a link layer to an application layer is discussed herein. The TOE is responsible for task offloading of a network layer and the transport layer, and the SSL/TLS offload engine is responsible for task offloading of the SSL/TLS protocol.

By the introduction above, it can be found that the current technical solution has the following disadvantages: (1) lacking full-stack capability and systematic integration. Although manufacturers provide offloading FPGA hardware of each protocol to achieve an Intellectual Property (IP) core, two problems still exist: on the one hand, offloading of computation-intensive tasks in an actual application is not thorough, for example, when original application data itself is data such as a picture, a compressed packet, etc., processing calculation on these data still needs to be achieved by software, i.e. the full-stack capability is insufficient; and on the other hand, although multiple upstream manufacturers provide FPGA implementations for handling these protocols, there is a lack of systematic integration. (2) Based on the full-stack capability, there is a lack of flexible offloading of self-defined original application data. At present, processing of big data is complicated, and widely used standard protocols or data formats cannot completely cover requirements of all FPGA network card users. When original application data sent or received by a user of an FPGA network card is of a self-defined type and contains heavy computation-intensive tasks, it is necessary to further process the "original application data", to obtain "processed data". For example, in today's world of neural networks being very popular, it is a common practice to deploy a neural network model in an FPGA. However, there are multiple neural network models. When a neural network model in the FPGA can be updated dynamically according to the requirements of a user, and data obtained by decrypting by the SSL/TLS offload engine is directly transferred to the neural network model in the FPGA for processing, it would be a very advantageous practice.

Figure 3:
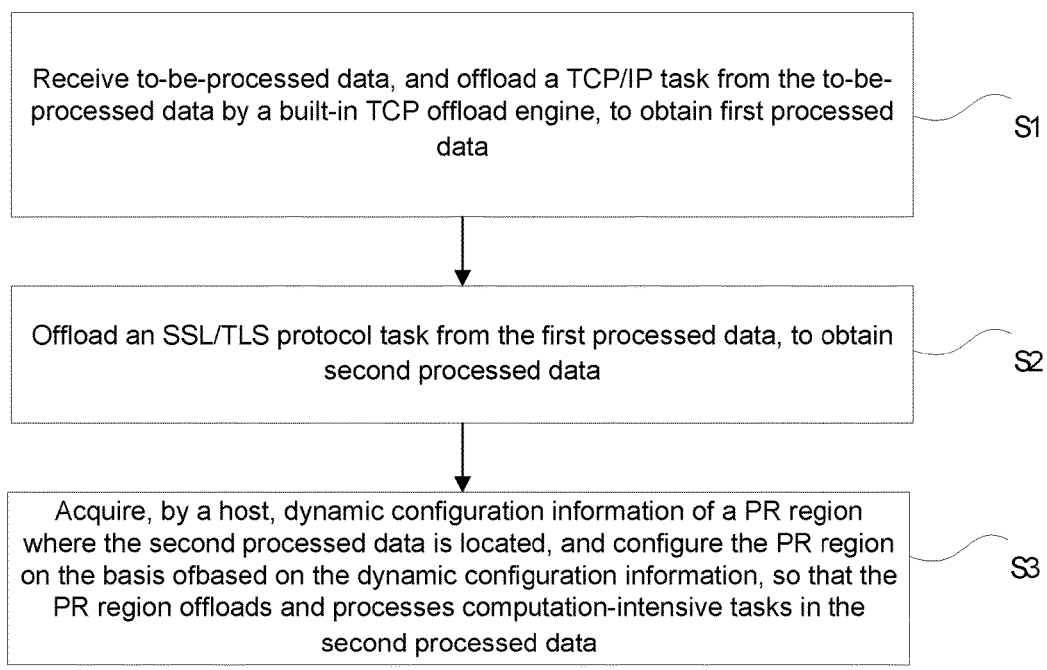
FIG. 3 is a flowchart of steps of a method for processing a full-stack network card task based on FPGA provided according to some embodiments of the present disclosure.

In some embodiments, please refer to FIG. 3, some embodiments of the present disclosure provide a method for processing a full-stack network card task based on FPGA. In some embodiments, the method includes:
  at step of S1, to-be-processed data is received, and a TCP/IP task from the to-be-processed data is offloaded by a built-in TCP offload engine, to obtain first processed data;
  at step of S2, an SSL/TLS protocol task from the first processed data is offloaded, to obtain second processed data; and
  at step of S3, dynamic configuration information of a PR region where the second processed data is located is acquired by a host, and the PR region is configured based on the dynamic configuration information, so that the PR region offloads and processes computation-intensive tasks in the second processed data.

In some embodiments, the SSL/TLS protocol task in the first processed data is offloaded, to obtain second processed data, includes:
  the first processed data is received, and the first processed data is distributed to at least one idle SSL/TLS engine according to status signals fed back by SSL/TLS engines, as to execute SSL/TLS protocol task processing, and to generate at least one piece of second processed data; and
  the at least one piece of second processed data is acquired from the at least one idle SSL/TLS engines and transferred to the PR region.

In some embodiments, the first processed data is distributed to the at least one idle SSL/TLS engine according to status signals fed back by SSL/TLS engines, as to execute SSL/TLS protocol task processing, and to generate second processed data, includes:
  at least one SSL/TLS engine serial number of at least one idle SSL/TLS engine executing the SSL/TLS protocol task processing at this time is written into an FIFO memory; and
  the at least one SSL/TLS engine serial number is read from the FIFO memory, and the at least one piece of second processed data is acquired from at least one SSL/TLS engine corresponding to the at least one SSL/TLS engine serial number.

In some embodiments, dynamic configuration information of the PR region where the second processed data is located is acquired by the host, and the PR region is configured based on the dynamic configuration information, so that the PR region offloads and processes computation-intensive tasks in the second processed data, includes:
  the dynamic configuration information is acquired from a memory of the host, and the dynamic configuration information is stored; and
  the dynamic configuration information is taken out and sent to a PR IP core, and an interrupt signal is sent out after the sending is completed;
  the PR region is reconfigured and programmed based on the dynamic configuration information via a preset port by a fixed protocol; and
  a preset register of the PR IP core is read to determine whether the reconfiguration is successful, and the determination result is reported to the host via a PCIe.

In some embodiments, before the PR region is reconfigured and programmed based on the dynamic configuration information via the preset port by the fixed protocol, the method further includes:
  whether the dynamic configuration information is correct is checked; and
  reconfiguration is performed on the PR region in response to the dynamic configuration information is correct.

In some embodiments, the FPGA communicates with the host via a PCIe bus.

In some embodiments, the PR region is a neural network model or an image inference model.

The method for processing a full-stack network card task based on FPGA at least has the following beneficial technical effects: 1. Modules written in Hardware Description Language (HDL) integrate and further develop offload engines provided by upstream manufacturers, realizes connection of task offloading of a network layer, a transport layer and an SSL/TLS protocol layer, thereby providing basis for further processing of subsequent data. 2. Modules written in HDL realize processing of self-defined data in combination with the function of a PR region of FPGA, and further offload computation-intensive tasks in original data, and even directly complete all processing tasks, which depends on user's requirements and the complexity degree of self-defined data processing tasks.

Figure 4:
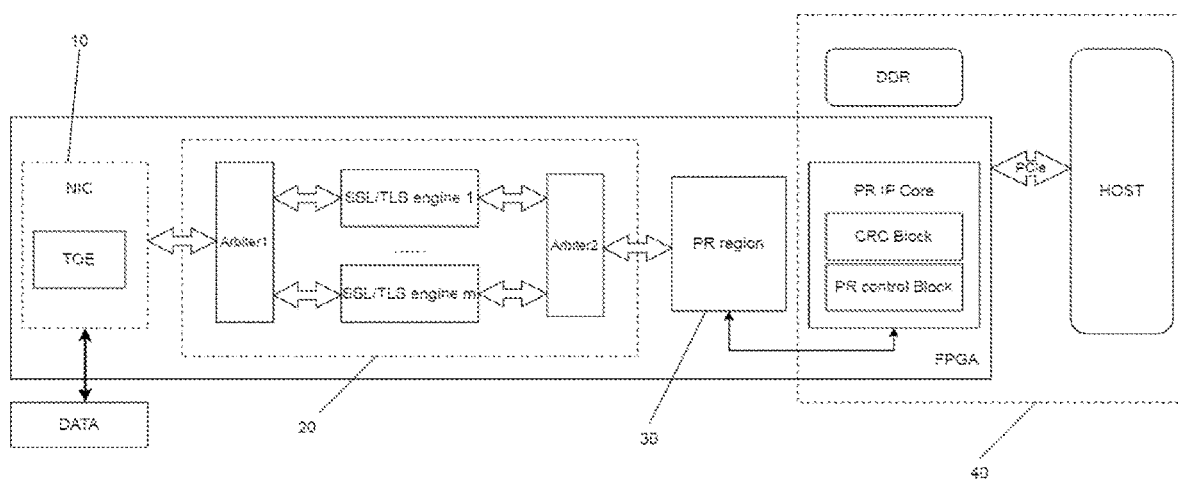
FIG. 4 is a schematic structural diagram of a system for processing a full-stack network card task based on FPGA provided according to some embodiments of the present disclosure.

In some embodiments, please refer to FIG. 4, some embodiments of the present disclosure provide a system for processing a full-stack network card task based on FPGA. In some embodiments, the system includes:
  a network interface controller 10, the network interface controller 10 is configured to receive to-be-processed data, and offload a TCP/IP task from the to-be-processed data by a built-in TCP offload engine, to obtain first processed data;
  an SSL/TLS protocol processing module 20, the SSL/TLS protocol processing module 20 is configured to receive the first processed data, and offload an SSL/TLS protocol task from the first processed data, to obtain second processed data;

a PR region 30, the PR region 30 is configured to receive the second processed data; and a reconfiguration module 40, the reconfiguration module 40 is configured to acquire, by a host, dynamic configuration information of the PR region 30, and configure the PR region 30 based on the dynamic configuration information, so that the PR region 30 offloads and processes computation-intensive tasks in the second processed data.

The system for processing a full-stack network card task based on FPGA can not only offload computation-intensive tasks in network layer and transport layer protocols, but also flexibly update the PR region according to actual requirements, thereby realizing dynamic multi-scenario task offloading of an application layer, which not only sufficiently releases a universal computing capability of a CPU of the host, fully utilizing FPGA resources, reducing energy consumption, but also greatly saves data processing time.

Figure 5:
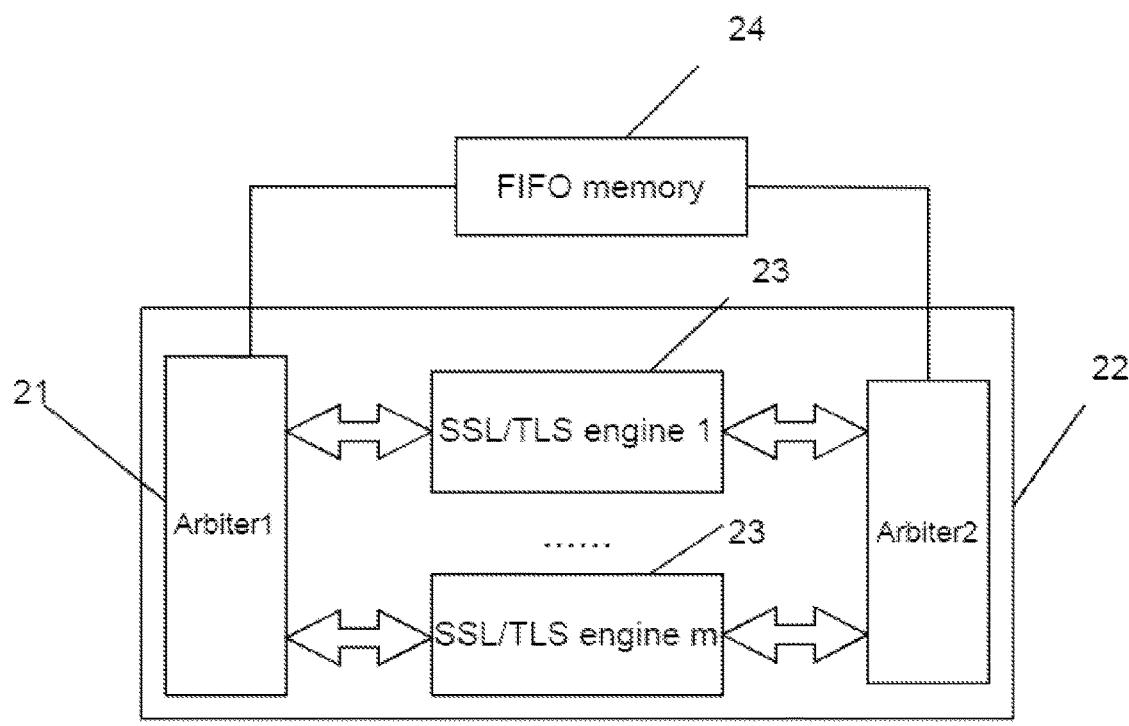
FIG. 5 is a schematic structural diagram of an SSL/TLS protocol processing module 20 provided according to some other embodiments of the present disclosure.

In some embodiments, please refer to FIG. 5, the SSL/TLS protocol processing module 20 includes a first arbitration module (Arbiter1) 21, a second arbitration module (Arbiter2) 22, and a plurality of SSL/TLS engines 23 in parallel between the first arbitration module 21 and the second arbitration module 22;

the first arbitration module 21 is configured to receive the first processed data from the network interface controller 10, and distribute the first processed data to at least one idle SSL/TLS engine 23 according to status signals fed back by SSL/TLS engines 23, as to execute SSL/TLS protocol task processing, and to generate at least one piece of second processed data; and the second arbitration module is configured to acquire the at least one piece of second processed data from the at least one idle SSL/TLS engine 23 and transfer the at least one piece of second processed data to the PR region 30.

In some embodiments, please refer to FIG. 5 again, the SSL/TLS protocol processing module 20 further includes an FIFO (First Input First Output) memory 24 connected to both the first arbitration module 21 and the second arbitration module 22;

the first arbitration module 21 is further configured to write at least one SSL/TLS engine serial number of at least one idle SSL/TLS engine executing the SSL/TLS protocol task processing at this time into the FIFO memory 24; and the second arbitration module 22 is further configured to read the at least one SSL/TLS engine serial number from the FIFO memory 24, and acquire the at least one piece of second processed data from at least one SSL/TLS engine 23 corresponding to the at least one SSL/TLS engine serial number.

Figure 6:
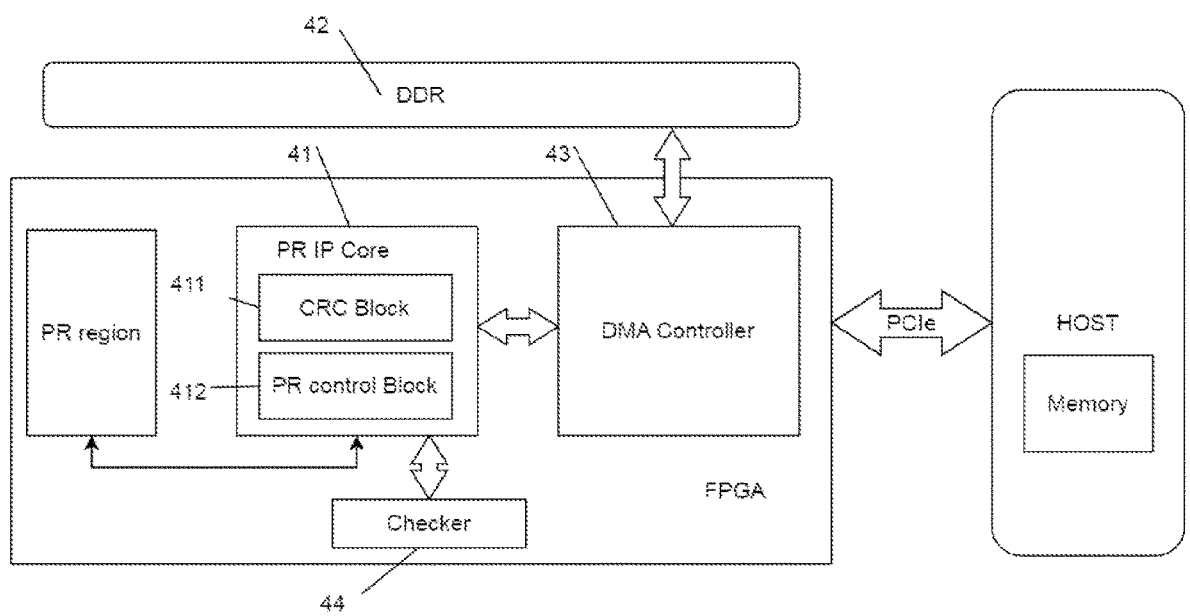
FIG. 6 is a schematic structural diagram of a reconfiguration module 40 provided according to some other embodiments of the present disclosure.

In some embodiments, please refer to FIG. 6, the reconfiguration module 40 includes a PR IP core 41, DDR 42, a DMA (Direct Memory Access) controller 43, and a Checker 44;

the DMA controller 43 is configured to acquire dynamic configuration information from a memory of the host according to a DMA descriptor sent by the host, and store the dynamic configuration information into the DDR 42; and the DMA controller 43 is further configured to take out the dynamic configuration information from the DDR 42 via a DDR controller and send the dynamic configuration information to the PR IP core 41, and send an interrupt signal to the Checker 44 after the sending is completed;

the PR IP core 41 is configured to reconfigure and program the PR region 30 based on the dynamic configuration information via a preset port by a fixed protocol; and the Checker 44 is configured to read a preset register of the PR IP core 41 to determine whether the reconfiguration is successful, and report a determination result to the host via a PCIe.

In some embodiments, please refer to FIG. 6 again, the PR IP core 41 includes a CRC module 411 and a PR control module 412;

the CRC module 411 is configured to check whether the dynamic configuration information is correct; and the PR control module 412 is configured to perform reconfiguration on the PR region 30 in response to the dynamic configuration information is correct.

In some embodiments, the PR IP core 41 is further configured to freeze activities of all other signals except a global signal while executing the reconfiguration and programming.

In some embodiments, the DMA controller 43 and the PR IP core 41 communicate via an Avalon bus.

In some embodiments, the Checker 44 and the PR IP core 41 communicate via an Avalon bus.

In some embodiments, the FPGA communicates with the host via a PCIe bus.

In some embodiments, the PR region 30 is a neural network model or an image inference model.

In some other embodiments, in order to facilitate illustration of the solutions of some embodiments of the present disclosure, in combination with FIG. 4 to FIG. 7, the modules above are developed by using HDL, and integrate TOE offload engines and SSL/TLS offload engines provided by upstream manufacturers, to offload computation-intensive tasks of an IP, a TCP and an SSL/TLS protocol; data obtained thereby is inputted into a PR region, and a circuit logic in the region can be dynamically reconfigured to support further processing of user-defined data. By means of such method, an FPGA-based dynamic multi-scenario trusted full-stack network card can be realized. The PR region provides basic guarantee for dynamic multi-scenarios, and the TOE and SSL/TLS offload engines provide trusted theoretical basis. In some embodiments, the system includes:

a Network Interface Controller (NIC), which is a traditional network interface controller (each FPGA manufacturer has a free IP hard core), wherein an ordinary NIC is only responsible for a link layer and a physical layer; however, in this example, the NIC of the FPGA-based network card provided by an upstream manufacturer includes a TOE module, and therefore, data outputted by the NIC module has been processed via a TCP/IP. In addition, the system further includes some other functional modules, and an interconnection bus (Avalon bus) between multiple modules, which is not drawn and will be introduced later.

A speed mismatch problem generally exists between the TOE engines and the SSL/TLS engines, for example, it is assumed that the speed of an actual physical network interface is 10 Gbps, the data processing speed of the TOE engine is usually designed according to the speed of the physical network interface, and can also reach 10 Gbps. However, as the SSL/TLS engines include a large amount of complex encryption and decryption computation, the data processing speed thereof is usually only a fraction of that of the TOE engine. Therefore, multiple SSL/TLS engines need to be instantiated to match the processing speed there between, which may otherwise lead to data jamming. The PR region is configured to process a protocol of an application layer or a self-defined data type, the data processing speed of the region is determined by a developer according to actual application situations, and a maximum design speed thereof is the speed of the physical network interface. Therefore, the Arbiter1 is configured to determine that data should be transferred to a relatively idle SSL/TLS engine according to a status signal fed back by SSL/TLS engines at the rear end thereof, and to write a SSL/TLS engine serial number that transfers data at this time into an FIFO memory; and the Arbiter2 then acquires the data from the corresponding SSL/TLS engine according to the SSL/TLS engine serial number in the FIFO memory, and transfers the data to the PR region for processing, thereby ensuring the correctness of a data stream sequence.

Figure 7:
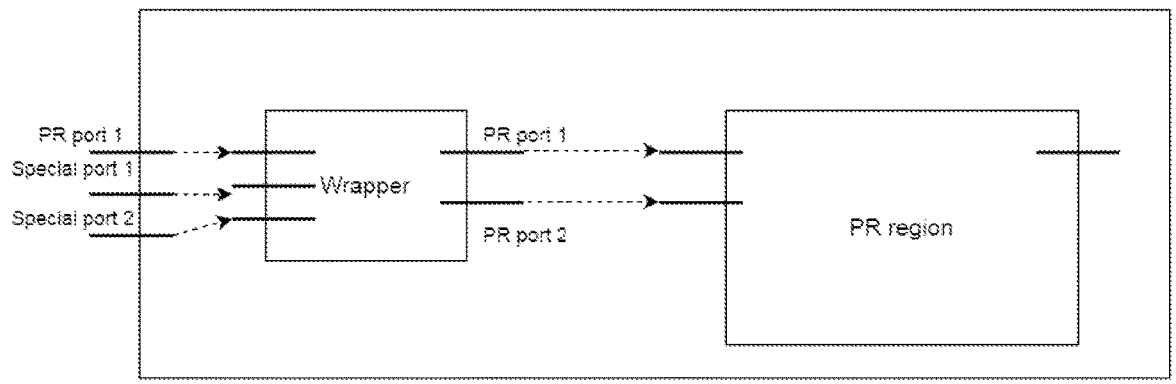
FIG. 7 is a schematic diagram of principle a wrapper provided according to some other embodiments of the present disclosure.

The PR region is a dynamically-reconfigurable region, and regions outside the PR region in the FPGA are referred to as a static region. From the perspective of a mature product, the size and position of the PR region cannot be changed, and a circuit therein can be dynamically reconfigured; and during product development, the size and position of the PR region is determined by a system developer. The PR region can be dynamically modified without interrupting the circuit of the static region. Since the actual circuit function of the PR region changes after reconfiguration, circuits represented by these data files for performing a reconfiguration operation on the PR region are referred to as "Personas"; each "Persona" must implement the same input and output ports, and these ports are boundaries between the static region and the PR region. When in the development stage, it is known in advance that a certain "Persona" has some special ports, then a wrapper may be created in HDL to encapsulate these ports, to ensure that input and output ports of all "Personas" in the PR region are consistent. The wrapper belongs to the static region, and a schematic diagram thereof is as shown in FIG. 7. After passing through the wrapper, two ports are converted into a PR port 2, to ensure that input and output ports of the PR region are always consistent; however, no processing is performed when a PR port 1 passes through the wrapper.

The PR IP Core is a controller provided by the FPGA manufacturer for dynamically reconfiguring the PR region, wherein a CRC block module is configured to check whether the data files configuring FPGA are correct, and a PR Control Block module executes the reconfiguration operation. In addition, some other modules (e.g. a PR data processing module, etc., which is not drawn) are further included. A schematic working diagram thereof is as shown in FIG. 6, wherein DDR is a memory on an FPGA board card; and DMA is configured to quickly move data between the FPGA and a HOST, and is widely applied in many scenarios.

In an implementation process, when the described system is configured to data processing, the PR region needs to be reconfigured, and reconfiguration steps are as follows:

at step of I, a Host obtains a data file requiring to be reconfigured from a hard disk or in other manners, and stores the data file requiring to be reconfigured in a memory of the Host;

at step of II, the Host sends a DMA descriptor to a DMA Controller in FPGA via a PCIe, and the DMA Controller can obtain the data file requiring to be reconfigured from the memory of the Host via a PCIe channel according to the descriptor, and temporarily stores the data file requiring to be reconfigured in DDR of an FPGA board card;

at step of III, the DMA Controller serves as a Master end of an Avalon bus, and the PR IP Core serves as a Slave end of the Avalon bus; therefore, the DMA Controller can start a reconfiguration operation by setting a register of the PR IP Core, and at this time, the PR IP Core may freeze activities of all other signals except a global signal in the PR region;

at step of IV, the DMA Controller takes dynamic configuration information out of the DDR via a DDR controller (not drawn in FIG. 6), and then sends the dynamic configuration information to the PR IP Core via the Avalon bus; after the sending is completed, the DMA Controller sends the interrupt signal to a Checker;

at step of V, the PR IP Core performs reconfiguration and programming on the PR region via some ports by fixed protocols by using the dynamic configuration information; and at step of VI, the Checker serves as a Master end of the Avalon bus, reads a register of the PR IP Core to determine whether the reconfiguration is successful, and reports relevant information to the Host via the PCIe.

For example, a typical application scenario of the system is described as follows: 1. a Host needs to process some application data from a network, these data is encapsulated and encrypted by using a TCP/IP and an SSL/TLS protocol, and these data itself also needs processing of some computation-intensive tasks (for example, neural network and image reasoning); 2. the Host acquires a dynamic configuration information file for the application data from a service provider, and stores same in a memory of the Host; or the Host itself develops a corresponding dynamic configuration information file according to specification of the service provider; 3. the Host reconfigures a PR region by using the dynamic configuration information file; and 4. by a reconfigured FPGA network card, the Host completes offloading of full-stack computation tasks from a network layer to an application layer.

The system for processing a full-stack network card task based on FPGA at least has the following beneficial technical effects: 1. Modules written in HDL integrate and further develop offload engines provided by upstream manufacturers, realizes connection of task offloading of a network layer, a transport layer and an SSL/TLS protocol layer, thereby providing basis for further processing of subsequent data. 2. Modules written in HDL realize processing of self-defined data in combination with the function of a PR region of FPGA, and further offload computation-intensive tasks in original data, and even directly complete all processing tasks, which depends on user's requirements and the complexity degree of self-defined data processing tasks.

Figure 8:
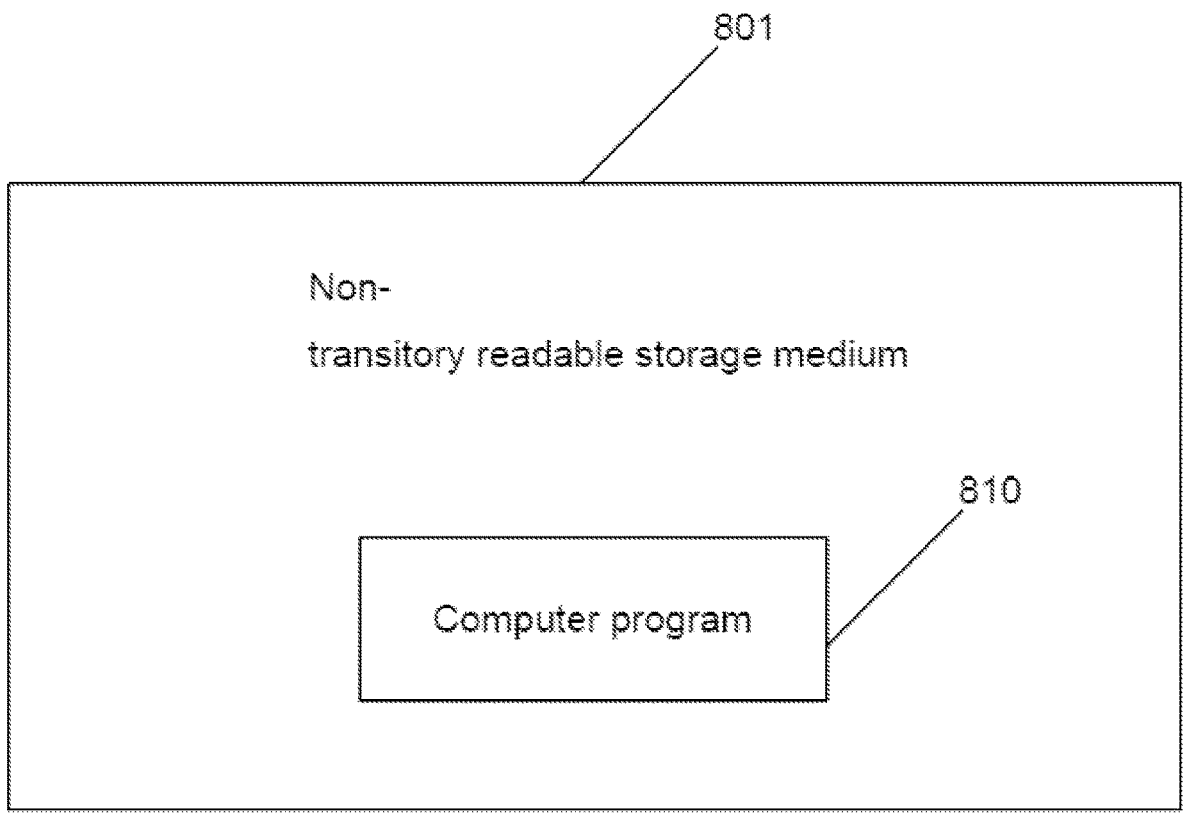
FIG. 8 is a schematic structural diagram of a non-transitory readable storage medium provided according to some embodiments of the present disclosure.

Based on the same inventive concept, according to another aspect of some embodiments of the present disclosure, as shown in FIG. 8, embodiments of the present disclosure further provide a non-transitory readable storage medium 801, wherein the non-transitory readable storage medium 801 stores computer program instructions 810, and when the computer program instructions 810 are executed by a processor, the steps of the embodiments of the method for processing a full-stack network card task based on FPGA are executed.

Furthermore, it should be understood that the non-transitory readable storage medium (e.g. memory) herein may be transitory memory or non-transitory memory, or may include both transitory memory and non-transitory memory.

Multiple component embodiments in the present disclosure may be implemented in hardware, or in software modules running on at least one processor, or in a combination thereof. A person skilled in the art should understand that, in practice, a microprocessor or a digital signal processor (DSP) may be used to implement some or all functions of some or all components in the computing processing device according to the embodiments of the present disclosure. Some embodiments of the present disclosure may also be implemented as executing a device or apparatus program (e.g. a computer program and a computer program product) for executing some or all of the method described herein. Such a program for implementing some embodiments of the present disclosure may be stored in a computer-readable medium, or may have a form of at least one signal. Such signals may be downloaded from an Internet website, or provided on carrier signals, or provided in any other form.

Figure 9:
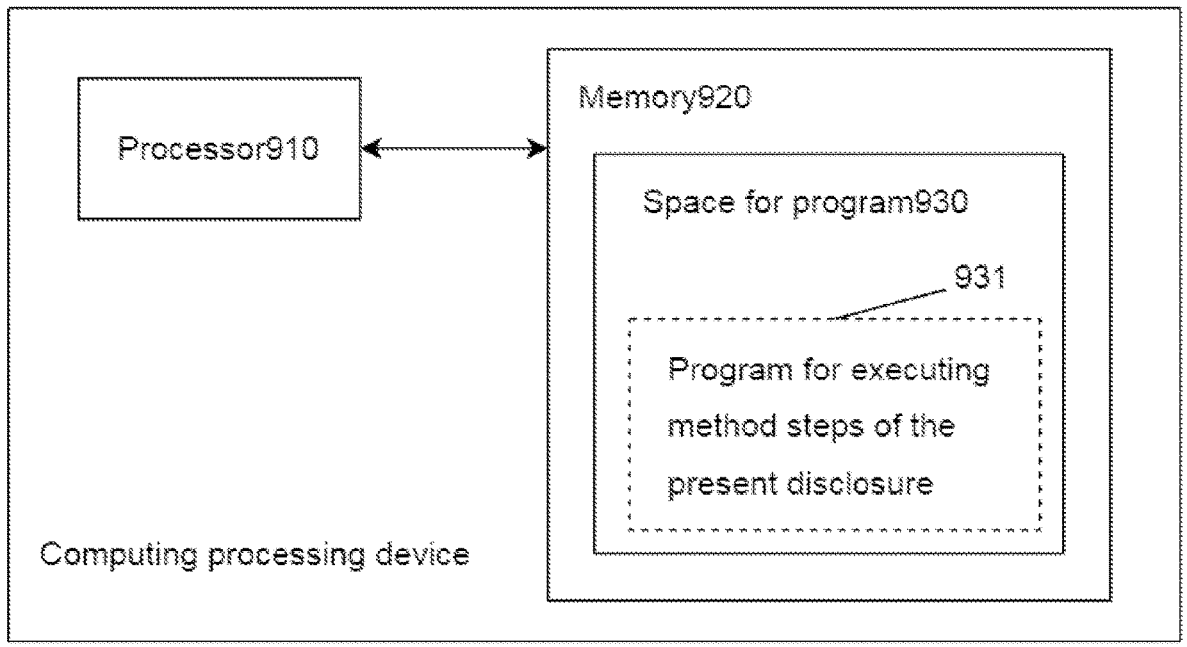
FIG. 9 schematically shows a block diagram of a computing processing device for executing the method according to some embodiments of the present disclosure.
Figure 10:
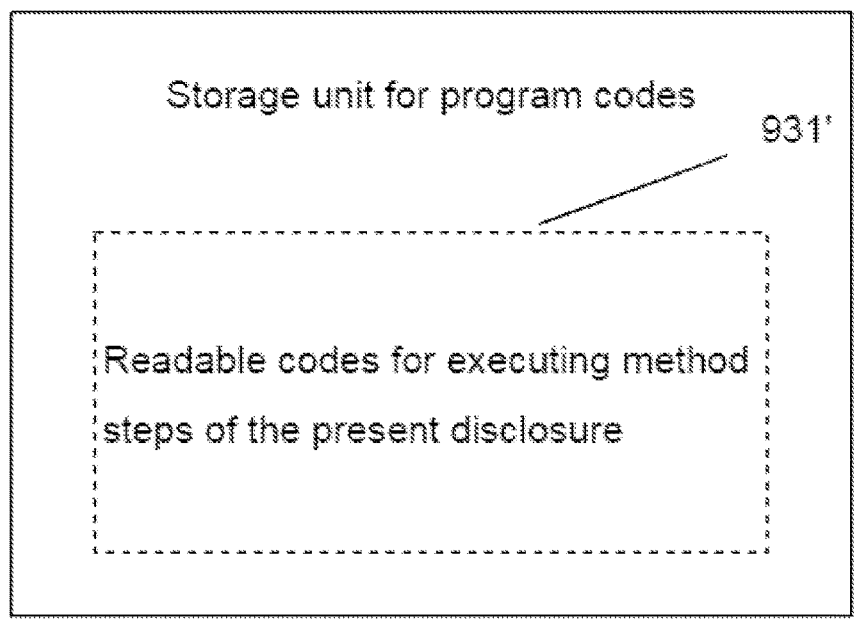
FIG. 10 schematically shows a storage unit for maintaining or carrying program codes implementing the method according to some embodiments of the present disclosure.

For example, FIG. 9 shows a computing processing device that can implement the method according to some embodiments of the present disclosure. The computing processing device includes a processor 910 and a computer program product or non-transitory readable storage medium which is in the form of a memory 920. The memory 920 may be an electronic memory such as a flash memory, an Electrically Erasable Programmable Read-Only Memory (EEPROM), an EPROM, a hard disk, or an ROM, and the like. The memory 920 has a storage space 930 for program codes 931 for executing any of the method steps as described above. For example, the memory space 930 for the program codes may comprise multiple program codes 931 for implementing steps in the method as described above. These program codes may be read out from at least one computer program product or written into the at least one computer program product. The computer program product includes program code carriers such as a hard disk, a compact disc (CD), a memory card, or a floppy disk. Such computer program products are typically a portable or fixed storage unit as described with reference to FIG. 10. The storage unit may have a storage section, a storage space, etc. arranged similarly to the memory 920 in the computing processing device of FIG. 9. The program codes may, for example, be compressed in a suitable form. Generally, the storage unit includes computer-readable codes 931', i.e., codes that can be read by a processor such as 910; and when these codes are run by the computing processing device, the computing processing device executes multiple steps in the method as described above.

Multiple features of the embodiments above can be combined in any way, and in order to make the description brief, all possible combinations of the technical features of the embodiments above are not described. However, as long as the combination of these technical features is not contradictory, the technical features should be considered to fall within the scope disclosed in the description.

The embodiments as described above merely represent several embodiments of the present disclosure, and the illustration thereof is detailed, but the detailed illustration cannot be understood as limiting the patent scope of the present disclosure. It should be noted that for a person of ordinary skill in the art, several modifications and improvements can be made without departing from the concept of the present disclosure, and all these modifications and improvements fall within the scope of protection of the present disclosure. Therefore, the patent scope of protection of the present disclosure shall be subject to the appended claims.

What is claimed is:

1. A method for processing a full-stack network card task based on Field-Programmable Gate Array (FPGA), the method comprising:
   receiving to-be-processed data, and offloading a Transmission Control Protocol (TCP)/Internet Protocol (IP) task from the to-be-processed data by a built-in TCP offload engine, to obtain first processed data;
   offloading an Secure Sockets Layer (SSL)/Transport Layer Security (TLS) protocol task from the first processed data, to obtain second processed data; and
   acquiring, by a host, dynamic configuration information of a Partial Reconfiguration (PR) region where the second processed data is located, and configuring the PR region based on the dynamic configuration information, so that the PR region offloads and processes computation-intensive tasks in the second processed data;
   wherein the PR region is a neural network model or an image inference model.

2. The method as claimed in claim 1, wherein offloading the SSL/TLS protocol task from the first processed data, to obtain the second processed data, comprises:
   receiving the first processed data, and distributing the first processed data to at least one idle SSL/TLS engine according to status signals fed back by SSL/TLS engines, as to execute SSL/TLS protocol task processing, and to generate at least one piece of second processed data; and
   acquiring the at least one piece of second processed data from the at least one idle SSL/TLS engine and transferring the at least one piece of second processed data to the PR region.

3. The method as claimed in claim 2, wherein distributing the first processed data to the at least one idle SSL/TLS engine according to status signals fed back by SSL/TLS engines, as to execute SSL/TLS protocol task processing, and to generate the at least one piece of second processed data, comprises:
   writing at least one SSL/TLS engine serial number of at least one idle SSL/TLS engine executing the SSL/TLS protocol task processing at this time into an First Input First Output (FIFO) memory; and
   reading the at least one SSL/TLS engine serial number from the FIFO memory, and acquiring the at least one piece of second processed data from at least one SSL/TLS engine corresponding to the at least one SSL/TLS engine serial number.

4. The method as claimed in claim 1, wherein acquiring, by the host, the dynamic configuration information of the PR region where the second processed data is located, and configuring the PR region based on the dynamic configuration information, so that the PR region offloads and processes computation-intensive tasks in the second processed data, comprises:
   acquiring the dynamic configuration information from a memory of the host, and storing the dynamic configuration information; and
   taking out the dynamic configuration information and sending the dynamic configuration information to a PR Intellectual Property (IP) core, and sending out an interrupt signal after the sending is completed;
   reconfiguring and programming the PR region based on the dynamic configuration information via a preset port by a fixed protocol; and reading a preset register of the PR IP core to determine whether the reconfiguration is successful, and reporting a determination result to the host via a Peripheral Component Interconnect express (PCIe).

5. The method as claimed in claim 4, wherein before reconfiguring and programming the PR region based on the dynamic configuration information via the preset port by the fixed protocol, the method further comprises:
checking whether the dynamic configuration information is correct; and
performing reconfiguration on the PR region in response to the dynamic configuration information is correct.

6. The method as claimed in claim 1, wherein the FPGA communicates with the host via a PCIe bus.

7. A system for processing a full-stack network card task based on Field-Programmable Gate Array (FPGA), the system comprising:
a network interface controller, configured to receive to-be-processed data, and offload a Transmission Control Protocol (TCP)/Internet Protocol (IP) task from the to-be-processed data by a built-in TCP offload engine, to obtain first processed data;
an Secure Sockets Layer (SSL)/Transport Layer Security (TLS) protocol processing module, configured to receive the first processed data, and offload an SSL/TLS protocol task from the first processed data, to obtain second processed data;
a Partial Reconfiguration (PR) region, the PR region being configured to receive the second processed data; and
a reconfiguration module, configured to acquire, by a host, dynamic configuration information of the PR region, and configure the PR region based on the dynamic configuration information, so that the PR region offloads and processes computation-intensive tasks in the second processed data;
wherein the PR region is a neural network model or an image inference model.

8. The system as claimed in claim 7, wherein the SSL/TLS protocol processing module comprises a first arbitration module, a second arbitration module and a plurality of SSL/TLS engines in parallel between the first arbitration module and the second arbitration module;
the first arbitration module, configured to receive the first processed data from the network interface controller, and distribute the first processed data to at least one idle SSL/TLS engine according to status signals fed back by SSL/TLS engines, as to execute SSL/TLS protocol task processing, and to generate at least one piece of second processed data; and
the second arbitration module, configured to acquire the at least one piece of second processed data from the at least one idle SSL/TLS engine and transfer the at least one piece of second processed data to the PR region.

9. The system as claimed in claim 8, wherein the SSL/TLS protocol processing module further comprises a First Input First Output (FIFO) memory connected to both the first arbitration module and the second arbitration module;
the first arbitration module, configured to write at least one SSL/TLS engine serial number of at least one idle SSL/TLS engine executing the SSL/TLS protocol task processing at this time into the FIFO memory; and
the second arbitration module, configured to read the at least one SSL/TLS engine serial number from the FIFO memory, and acquire the at least one piece of second processed data from at least one SSL/TLS engine corresponding to the at least one SSL/TLS engine serial number.

10. The system as claimed in claim 7, wherein the reconfiguration module comprises a PR Intellectual Property (IP) core, Double Date Rate (DDR), a Direct Memory Access (DMA) controller and a Checker;
the DMA controller, configured to acquire dynamic configuration information from a memory of the host according to a DMA descriptor sent by the host, and store the dynamic configuration information into the DDR; and
the DMA controller, configured to take out the dynamic configuration information from the DDR via a DDR controller and send the dynamic configuration information to the PR IP core, and send an interrupt signal to the Checker after the sending is completed;
the PR IP core, configured to reconfigure and program the PR region based on the dynamic configuration information via a preset port by a fixed protocol; and
the Checker, configured to read a preset register of the PR IP core to determine whether the reconfiguration is successful, and report a determination result to the host via a Peripheral Component Interconnect express (PCIe).

11. The system according to claim 10, wherein the PR IP core comprises a Cyclic Redundancy Check (CRC) module and a PR control module;
the CRC module, configured to check whether the dynamic configuration information is correct; and
the PR control module, configured to perform reconfiguration on the PR region in response to the dynamic configuration information is correct.

12. The system according to claim 10, wherein the PR IP core is further configured to freeze activities of all other signals except a global signal while executing the reconfiguration and programming.

13. The system as claimed in claim 10, wherein the DMA controller and the PR IP core communicate via an Avalon bus.

14. The system as claimed in claim 10, wherein the Checker and the PR IP core communicate via an Avalon bus.

15. The system as claimed in claim 7, wherein the FPGA communicates with the host via a PCIe bus.

16. A computing processing device, comprising:
a memory in which computer-readable codes are stored; and at least one processor, wherein when the computer-readable codes are executed by the at least one processor, the computing processing device executes following actions:
receive to-be-processed data, and offload a Transmission Control Protocol (TCP)/Internet Protocol (IP) task from the to-be-processed data by a built-in TCP offload engine, to obtain first processed data;
offload a Secure Sockets Layer (SSL)/Transport Layer Security (TLS) protocol task from the first processed data, to obtain second processed data; and
acquire, by a host, dynamic configuration information of a Partial Reconfiguration (PR) region where the second processed data is located, and configure the PR region based on the dynamic configuration information, so that the PR region offloads and processes computation-intensive tasks in the second processed data;
wherein the PR region is a neural network model or an image inference model.

17. The computing processing device according to claim 16, wherein when the computer-readable codes are executed by the at least one processor, the computing processing device executes following actions:

receive the first processed data, and distributing the first processed data to at least one idle SSL/TLS engine according to status signals fed back by SSL/TLS engines, as to execute SSL/TLS protocol task processing, and to generate at least one piece of second processed data; and acquire the at least one piece of second processed data from the at least one idle SSL/TLS engine and transferring the at least one piece of second processed data to the PR region.

18. The computing processing device according to claim 17, wherein when the computer-readable codes are executed by the at least one processor, the computing processing device executes following actions:

write at least one SSL/TLS engine serial number of at least one idle SSL/TLS engine executing the SSL/TLS protocol task processing at this time into a First Input First Output (FIFO) memory; and read the at least one SSL/TLS engine serial number from the FIFO memory, and acquiring the at least one piece of second processed data from at least one SSL/TLS engine corresponding to the at least one SSL/TLS engine serial number.

\* \* \* \* \*